United States Patent
Forster

[15] 3,656,054
[45] Apr. 11, 1972

[54] LEAKAGE FIELD FLAW DETECTOR WITH CURRENT ENERGIZATION WITH MEANS TO CONTROL CURRENT ENERGIZATION BY PROBE SCAN

[72] Inventor: Friedrich M. O. Forster, Der Schoene Weg 144, 741 Reutlingen, Germany

[22] Filed: July 14, 1969

[21] Appl. No.: 848,388

[52] U.S. Cl. ................................................324/37
[51] Int. Cl. ................................................G01r 33/12
[58] Field of Search ..........................324/34, 37, 40

[56] References Cited

UNITED STATES PATENTS

| | | | |
|---|---|---|---|
| 2,648,435 | 8/1953 | Kodis | 324/37 |
| 2,979,655 | 4/1961 | DeForest | 324/34 |
| 2,994,032 | 7/1961 | Hansen | 324/37 |
| 3,401,332 | 9/1968 | McClurg et al. | 324/37 |

FOREIGN PATENTS OR APPLICATIONS

| | | | |
|---|---|---|---|
| 1,130,940 | 10/1968 | Great Britain | 324/37 |
| 1,493,240 | 7/1967 | France | 324/37 |

Primary Examiner—Rudolph V. Rolinec
Assistant Examiner—R. J. Corcoran
Attorney—Dan R. Sadler

[57] ABSTRACT

A nondestructive testing apparatus and method are disclosed herein for testing objects by measuring the stray magnetic flux field adjacent the surface thereof. The workpiece is magnetized by means of a pulsed electric current circulating therethrough during a portion of the test interval whereby the magnetizing is accomplished with a minimum amount of power. The amount of magnetizing power required is further reduced by recording the stray fields on a magnetic medium such as a flexible tape and subsequently scanning the tape with a suitable magnetic pickup probe.

5 Claims, 3 Drawing Figures

Patented April 11, 1972

FRIEDRICK M.O. FÖRSTER,
INVENTOR

BY Jan R Sadler
ATTORNEY

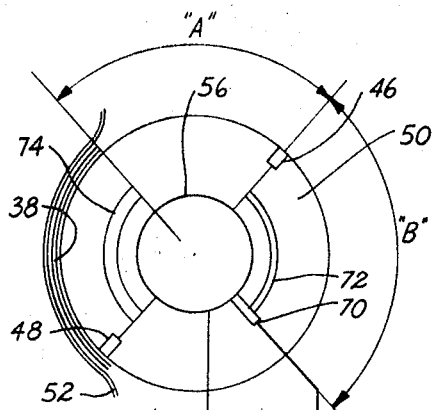
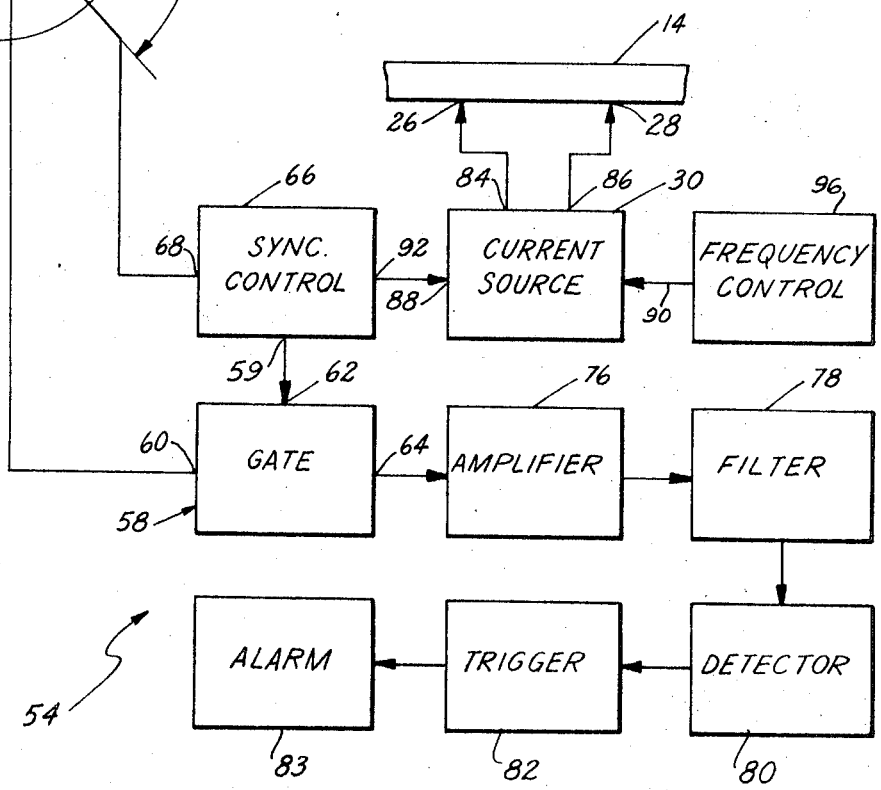
Fig. 2
FRIEDRICK M.O. FÖRSTER,
INVENTOR
ATTORNEY

LEAKAGE FIELD FLAW DETECTOR WITH CURRENT ENERGIZATION WITH MEANS TO CONTROL CURRENT ENERGIZATION BY PROBE SCAN

BACKGROUND OF INVENTION

It is highly desirable to nondestructively test workpieces such as steel billets, rods, bars and tubes, etc., for flaws. One means of accomplishing this is to use the so-called stray field type of magnetic testing wherein the workpiece is magnetized. If the workpiece is free of flaws the magnetic flux field will remain within the workpiece and/or will be substantially uniform over the surface of the workpiece. However, if there are any flaws present, particularly in or near the surface, a stray magnetic field will be produced above the surface. These stray fields may then be detected and/or measured to locate the flaw and/or determine its dimensions.

Although there are several ways of magnetizing the workpiece one common way is to circulate an electric test current through the workpiece. This current produces a magnetic flux field substantially concentric to the flow of current. Although such a current is effective to provide a suitable magnetization it has been found the current must be of a very substantial magnitude. As a consequence very substantial amounts of power are required. This in turn has required the power supply for producing the test current as well as the related equipment to not only be of a large and bulky nature but also to be very expensive.

There are various means for sensing the stray fields present above the surface of the workpiece. One way is to utilize a suitable magnetic pickup probe for scanning across the surface of the workpiece. When such a probe passes through a stray field it produces a corresponding electric signal. If the workpiece is capable of being permanently magnetized, the probe may sense the residual field. However, if it is desired to obtain a very high flux density and/or the workpiece cannot be permanently magnetized, it is necessary for the magnetizing current to be "ON" at all times while the pickup probe is scanning the workpiece. This requires a large amount of power to be consumed for an extended period of time.

It may thus be seen that although this form of testing is satisfactory for locating many types of flaws, it has been found very high electrical currents and large amounts of power are frequently required, particularly when testing relatively large objects, such as steel billets, bars, pipes, etc.

SUMMARY

The present invention provides means for overcoming the foregoing difficulties. More particularly the present invention provides means for magnetically testing a workpiece with a low current and consuming a minimum amount of power while at the same time providing improved test results. Instead of circulating the current through the entire length of the workpiece, the current is circulated through only a very small segment of the workpiece immediately adjacent the area where the stray fields are being measured. This is accomplished by progressively and continuously advancing the workpiece through a test station wherein electrical contacts, such as brushes and/or rollers engage the workpiece immediately in front of and immediately behind the test area.

In addition the test or magnetizing current is obtained from a power supply which is effective to produce a pulsating unidirectional current. The current pulses are effective to produce a corresponding pulsating magnetic field. At the apex of each pulse the density of the stray field is adequate to obtain an accurate detection of the flaws. Also, during the rapid rise and fall of the magnetic field eddy currents are created whereby an additional flux field is produced above the surface of the workpiece. A recording medium, such as a magnetic recording tape preserves these fields for subsequent scanning.

BRIEF DESCRIPTION OF THE DRAWINGS

FIG. 2 - is a block diagram of the nondestructive testing system employed with the test station of FIG. 1;

FIG. 3 - is a view of the wave forms present in the testing system.

Figure 1:
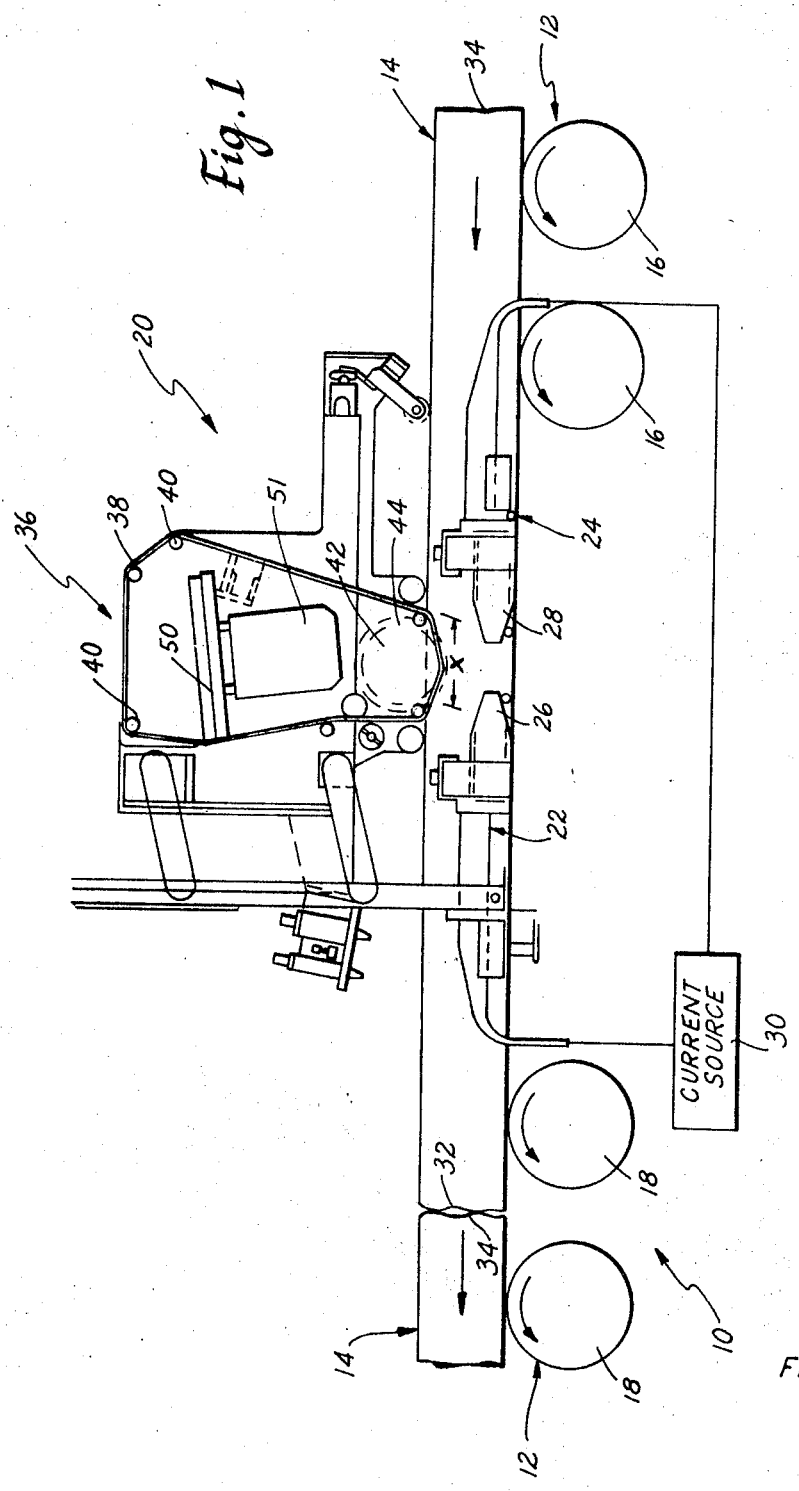
FIG. 1 - is a side view of a nondestructive testing station embodying one form of the present invention.

Referring to the drawings in more detail, the present invention is particularly adapted to be embodied in a nondestructive testing system 10 for inspecting elongated workpieces such as steel bars, rods, pipes, billets, etc.

A conveyor line 12 may be provided for carrying the workpieces 14 in an axial direction. In the present instance this line 12 includes a plurality of rollers 16 and 18. These are adapted to carry the workpiece axially therealong at a substantially uniform rate. In the embodiment of FIG. 1 the direction of travel is from right-to-left.

A test station 20 is provided in the conveyor line 12 whereby the workpieces 14 being carried therealong pass through the station 20 and are inspected. Although the station 20 may perform any desired type of test, in the present instance it performs a so-called magnetic stray flux field test.

In a system of this nature when inspecting a ferromagnetic workpiece, a magnetic field is created within the workpiece. If it is free of discontinuities, such as cracks, seams, laps, pits, etc., the field will remain within the workpiece. None of the field will extend above the surface or at least the field above the surface will be of essentially uniform density. However, if there is a defect of the foregoing nature, at least a portion of the field extends above the surface in the region immediately adjacent the defect. The magnitude of this stray field is determined in part by the size of the defect, its depth beneath the surface, etc. It is also the greatest when the defect is disposed at right angles to the direction of the field.

Although the present system 10 may detect defects of any orientation, in the present instance the workpieces 14 most commonly have defects which extend in an axial direction. In order to locate and identify defects of this nature by a magnetic leakage field system, a magnetic flux field may be created in the workpiece to extend transversely across the face of the workpiece 14 at right angles to the defect.

Although the magnetic field may be created by any desirable means, in the present instance a test or magnetizing current is circulated axially through the workpiece 14. Since an electric current produces a magnetic field that extends concentrically around the current, the current flowing axially of the workpiece 14 produces a flux field extending circumferentially around the workpiece.

In order to inject the magnetizing or test current into the workpiece 14, two sets 22 and 24 of contacts are provided in the test station 20. In the present instance each set includes a pair of rollers 26 and 28. The rollers 26 and 28 in each set 22 and 24 are disposed on the opposite sides of the workpiece 14 so as to ride along the sides as it travels through the test station. The contacts are preferably as close as possible together whereby the current will only flow through a minimum volume of the workpieces.

The roller contacts 26 and 28 are connected to a current source 30 capable of providing a current of sufficient magnitude for producing the required field intensity. It will be seen that since the two sets 22 and 24 of contacts 26 and 28 are relatively close together, the current flowing axially within the workpiece 14 tends to be somewhat non-uniformly distributed within the workpiece particularly in a transverse direction. Normally the current will tend to be concentrated along the sides of the workpiece.

It has been found that if the current flows through the workpiece 14 for a sufficient distance it tends to be substantially uniformly distributed throughout the workpiece. However, under these circumstances the magnetizing force tends to be greatest along the center and least along the edges. This is particularly true when the workpiece has a square cross section like a steel billet. If the roller contacts are close enough together the non-uniform distribution of current can tend to offset the foregoing effect whereby the magnetizing force is substantially uniform.

It has been found desirable for the driving rollers 16 which are in front of the inspection station 20 to run at a slightly higher speed than the rollers 18 behind the station 20. This will cause the workpieces 14 approaching the test station 20 to travel faster than those leaving the test station 20. The faster traveling workpieces 14 will overrun the slower moving workpieces 14 and tend to push them along the conveyor 12. As a result the abutting ends 32 and 34 of the workpieces 14 are tightly jambed together. The electrical test current will thereby be able to flow from one workpiece to the other even though the ends may be somewhat irregular. Accordingly, when the abutting ends 32 and 34 move between the contacts 26 and 28 the test current will continue to flow whereby the workpieces can be tested right up to their ends.

The test station 20 is adapted to inspect the workpiece 14 by sensing the stray fields produced above the surface by the foregoing test current. The present test station 20 includes an inspection head 36 mounted adjacent the conveyor 12 for engaging the workpieces 14 as they pass through the station 20. The inspection head 36 includes means for at least temporarily recording the stray fields whereby they may be subsequently scanned. In the present instance the recording means includes a loop or an endless belt 38 of magnetic tape.

The belt 38 is supported by a plurality of idler rollers 40 and one large roller 42. The large roller 42 preferably includes a resilient rim or tire 44 which is effective to maintain a substantial segment of the belt 38 tightly compressed against the surface of the workpiece 14. Normally the rim or tire 44 is formed of a soft resilient material, such as sponge rubber whereby the belt 38 will contact the workpiece 14 over a distance "X" (FIG. 1). As a result although the surface of the workpiece 14 may be somewhat rough and/or irregular, the exterior of the belt 38 will always be forced into intimate contact with all parts of the surface.

The belt 38 may be a more or less conventional recording tape. However, since the belt 38 operates in a fairly severe environment, rolling across rough and irregular surfaces and is exposed to considerable dirt, scale, abrasions, etc., it is desirable for the belt 38 to "ruggedized". This may be accomplished by embedding or coating the magnetic particles on an abrasion resistant tough plastic material.

It can be appreciated that since the surface of the belt 38 is forced against the exposed surface of the workpiece 14 with a substantially uniform pressure, any of the stray magnetic fields produced on the surface of the workpiece 14 will be recorded by the magnetic particles on the belt 38. Moreover, since the spacing between the particles and the surface of the workpiece 14 is substantially constant there is a linear relation between the stray fields and their recordings.

In order to "read" the recordings and produce signals corresponding to the discontinuities, a pickup probe 46 may be provided for continuous scanning of the belt 38 as it travels around the rollers 40 and 42. Although this may be accomplished in any suitable manner, in the present instance a turntable 50 is mounted adjacent the belt 38 in a plane at substantially right angles thereto. The turntable 50 is driven by a motor 51.

Guide means, such as an arcuate shoe 52, may be provided for forming the belt 38 into a semi-cylindrical shape closely following the periphery of the turntable 50. A plurality of pickup probes 46 and 48 are mounted on the turntable 50 so as to successively sweep across the belt 38 in a series of substantially parallel transverse lines. Each time a probe passes through a recorded field it produces an electrical signal corresponding thereto.

The probes 46 and 48 are connected to a suitable indicating system 54 (see FIG. 2). The probes may be connected to the indicating system 54 by a suitable commutator and brush. However, in the present instance a so-called contactless transformer 56 is employed. This includes a rotating winding on the turntable which moves therewith and is connected directly to the probes 46 and 48. A stationary winding is inductively coupled to the rotating winding and to the indicating system 54.

In the present instance the input of this system 54 includes a switch or gate 58. The gate 58 includes a signal input 60, a control input 62 and a signal output 64. The control input 62 for the gate 58 is coupled to one output 59 of a synchronizing control 66. The control input 68 for the synchronizing control 66 is coupled to a pickup probe 70 positioned adjacent the turntable 50. A plurality of arcuate segments 72 and 74 are provided on the turntable 50 so as to pass the probe 70.

The segments 72 and 74 are positioned and arranged to correspond to the passage of the pickup probes 46 and 48 across the belt 38. This in turn will cause the gate 58 to be OPENED and CLOSED as it rotates through arcs A and B and synchronously with the passage of the probes 46 and 48 across the belt 38. As a result of this arrangement when a probe 46 or 48 is scanning across the belt 38 and is producing defect signals, the gate 58 is OPEN and passes the signals. However, when the probes 46 and 48 are not scanning the belt 38 and may be producing noise the gate 58 is CLOSED and blocks the passage of the noise.

The signal output 64 from this gate 58 is coupled to a suitable amplifier 76 for amplifying the signals to a more useful level. The amplifier 76 is in turn connected to a suitable filter 78 which has a pass band centered around the frequency of the signals whereby the signal-to-noise ratio is improved. The filter 78 is in turn connected to a suitable rectifier or detector 80.

The detector 80 is effective to convert the AC and/or pulse type signals into a DC or slowly varying signal having an amplitude corresponding to the envelope of the signal. The detected signal will thus correspond to any defects, etc., which may be present.

The output of the detector 80 is in turn coupled to a trigger 82 having a threshold level corresponding to the maximum acceptable defect. The trigger 82 is in turn coupled to a suitable alarm 83, paint spray, etc., for indicating the presence of defects.

The power supply or current source 30 for supplying the test current has a pair of power outputs 84 and 86 connected to the roller contacts 26 and 28 and a pair of control inputs 88 and 90. The first control input 88 is coupled to a second output 92 from the synchronizing control 66. This output 92 operates essentially as the reciprocal of the first output 59. As a consequence, when either of the probes 46 or 48 are scanning the belt 38 and the gate 58 is OPEN, the current source 30 is shut OFF and no test current is flowing through the workpiece 14. As a result the probes 46 and 48 will not be receiving any noise which might be produced by the test current. However, when the gate 58 is CLOSED and no signals can pass therethrough, the current source 30 is turned ON and the test current is flowing.

The test current may be of the DC variety, i.e., constant amplitude and polarity. Alternatively it may be of a sinusoidal nature similar to the dotted line 92 in FIG. 3. However, in the present instance, the current source preferably includes means for producing a series of relatively short pulses 94 which persist for a small fraction of each cycle. By way of example, the current source 30 may include some form of amplitude responsive means which cuts off the current flow when it reaches a predetermined level. Since the test current is flowing for a relatively short part of each cycle a smaller amount of power is required than with a continuous direct current. Also, since the current flow "rises" and "falls" very rapidly, the corresponding rise and fall of the magnetic field causes corresponding eddy currents to circulate within the workpiece 14. These eddy currents tend to decrease the current flowing in the inner portion of the workpiece which in turn is effective to increase the magnetizing current flowing on or adjacent the surface. This may be considered as pushing the magnetizing field away from the center of the workpiece and radially out toward the surface. This in turn increases the field strength on the surface of the workpiece. This is of great importance insofar as it increases the field strength in and around the corners of the billet.

The second input 90 is coupled to a frequency control 96 which is effective to control the frequency of the pulses 94. This frequency should be low enough to insure the test current circulating throughout the workpiece. However, the frequency should be high enough to insure at least one pulse 94, preferably several, to occur during the interval required for the workpiece 14 to travel the distance "X". This will insure at least one pulse 94 occurring during the interval any given portion of the workpiece 14 is in contact with the belt 38.

In order to use this system, a series of workpieces 14 are fed along the conveyor line 12 and through the inspection station 20. The rollers 16 are effective to carry the workpieces 14 ahead of the inspection station 20 at a velocity which is slightly greater than the velocity of the workpieces 14 carried by rollers 18 behind the inspection station 20. When a workpiece 14 travels through the inspection station it tends to slow down slightly. As a consequence the front ends 32 of the workpieces will be jambed tightly against the trailing ends 34 of the workpiece as they pass through the inspection station 20.

As a workpiece 14 travels through the inspection station 20 the roller contacts 26 and 28 will travel along the two sides of the workpiece 14 and circulate a test current through it. This current in turn produces magnetic stray fields transversely across the face of the workpiece 14.

Preferably the contacts 26 and 28 are very close together whereby the amount of material through which the current is flowing is reduced to a minimum. This will greatly decrease the power requirements. Moreover, when the end of a workpiece 14 is passing between the rollers 26 and 28 there is a minimum portion of the workpiece wherein the current is disturbed. Moreover, if the two ends 32 and 34 are jambed tightly together the current will flow continuously permitting inspecting the workpiece all the way to the end.

During the movement of the workpiece 14, the belt 38 moves around the rollers 40 and 42 and rolls along the surface of the workpiece 14. As a consequence any stray magnetic fields present above the workpiece 14 are recorded on the belt 38 and the probes 46 and 48 produce corresponding defect signals.

The current source 30 produces a series of pulses 94 of current similar to those in FIG. 3 but only during the intervals when the probes 46 and 48 are not scanning the belt. Since the pulses 94 of current only flow during this limited interval and then only occur during a limited part of each cycle, the amount of power required is greatly reduced from that required if a DC test current were employed. Each pulse 94 of current is of sufficient magnitude to produce a large stray magnetic field while it is at its peak intensity. The pulses 94 occur at time intervals less than required for workpiece 14 to travel the distance "X". As a result a stray field for all parts of the workpiece is recorded on the belt 38.

The relatively fast rise and fall of the test current produces eddy currents within the workpiece 14. These eddy current radiate magnetic fields which are also recorded on the magnetic tape. As described above, these eddy currents are effective to increase the field strength on the surface of the workpiece and particularly in and around the corners of a billet. Accordingly, in the event there are any defects or irregularities in the workpiece, the strength of the recordings are increased whereby a strong defect signal is produced with a minimum amount of power.

It is to be noted that the tape contacts the surface of the workpiece 14 over a distance "X". The frequency of the current pulses should be kept as low as possible. However, at least one, but preferably several pulses should occur during the time interval required for the workpiece to advance a distance equal to "X". This will insure the entire volume being thoroughly inspected.

I claim:

1. A nondestructive testing system for inspecting a workpiece, said system including the combination of
transport means for continuously carrying said workpiece through a test position,
means for circulating an electrical test current through a test segment of the workpiece as it is being carried through the test position,
a current source coupled to said means for supplying said test current whereby said test current circulates through said test segment and produces a stray magnetic field adjacent the surface of the test segment,
magnetic recording means adapted to continuously engage the exterior surface of said test segment as it is carried through the test position and record stray magnetic fields thereon,
a pickup probe positioned to intermittently scan the magnetic recording means and produce corresponding electrical signals,
output means coupled to the pickup probe and responsive to said signals to indicate the characteristics of the workpiece, and
control means responsive to the probe scanning said recording means, said control means being effective to disable the current source and enable the output means during the intervals when the probe is scanning the recording means, said control means being effective to disable the output means and enable the current source during at least a portion of the intervals when the pickup probe is not scanning the recording means.

2. The combination of claim 1 including
means in the current source effective to supply a test current which includes a series of unipolar pulses.

3. A nondestructive testing system for inspecting a workpiece, said system including the combination of
an inspection station,
a conveyor for transporting said workpieces through the inspection station,
means in said station for circulating a test current through a test segment,
a current source coupled to said means for supplying said test current, said current being effective to produce stray magnetic fields adjacent the surface of the test segment,
an endless magnetic belt having a section thereof in engagement with the surface of the test segment for recording the stray field thereon,
a rotating turntable adjacent the endless magnetic belt,
a pickup probe mounted on said turntable and positioned to scan across said belt as said turntable rotates, said pickup probe being responsive to the recorded stray fields and effective to produce electrical signals corresponding to the recordings, and
control means responsive to the rotation of said turntable and effective to disable the current source during the intervals when the probe is scanning the belt.

4. The combination of
a workpiece transport,
electrical contacts positioned to electrically contact a workpiece on said transport,
a current source coupled to said contacts,
pickup means positioned to intermittently scan the workpiece, and
means responsive to the position of the pickup means, said last means being coupled to said current source to disable the current source during the intervals the pickup means is scanning and enabling the current source during the intervals when the pickup means is not scanning.

5. The combination of
a current source for supplying a test current,
a pair of contacts coupled to the current source, said contacts being positioned to engage a workpiece and circulate a test current therethrough,
magnetic recording means positioned to engage the workpiece,
a pickup probe positioned to intermittently scan the magnetic recording means,
output means coupled to the pickup probe, and
control means responsive to the position of said probe and effective to disable and enable the current source.